United States Patent
Mair

(10) Patent No.: US 10,259,462 B2
(45) Date of Patent: Apr. 16, 2019

(54) METHOD FOR COUPLING A POWER TAKE-OFF

(71) Applicant: ZF Friedrichshafen AG, Friedrichshafen (DE)

(72) Inventor: Roland Mair, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 221 days.

(21) Appl. No.: 15/361,138

(22) Filed: Nov. 25, 2016

(65) Prior Publication Data
US 2017/0151953 A1    Jun. 1, 2017

(30) Foreign Application Priority Data

Nov. 27, 2015   (DE) .................... 10 2015 223 595

(51) Int. Cl.
| | |
|---|---|
| *B60W 30/188* | (2012.01) |
| *B60W 10/02* | (2006.01) |
| *B60W 10/06* | (2006.01) |
| *B60W 10/18* | (2012.01) |
| *B60W 30/18* | (2012.01) |
| *B60W 50/10* | (2012.01) |
| *B60W 10/10* | (2012.01) |

(52) U.S. Cl.
CPC ........ *B60W 30/1888* (2013.01); *B60W 10/02* (2013.01); *B60W 10/06* (2013.01); *B60W 10/10* (2013.01); *B60W 10/18* (2013.01); *B60W 10/182* (2013.01); *B60W 30/18027* (2013.01); *B60W 30/18054* (2013.01); *B60W 50/10* (2013.01); *B60W 2510/0208* (2013.01); *B60W 2510/1005* (2013.01); *B60W 2520/10* (2013.01); *B60W 2540/04* (2013.01); *B60W 2710/021* (2013.01); *B60W 2710/0666* (2013.01)

(58) Field of Classification Search
None
See application file for complete search history.

(56) References Cited

U.S. PATENT DOCUMENTS

| | | | |
|---|---|---|---|
| 9,381,808 B2* | 7/2016 | Sauter ..................... | B60K 17/28 |
| 2006/0241840 A1* | 10/2006 | Steen ..................... | B60K 17/28 |
| | | | 701/51 |
| 2015/0008057 A1* | 1/2015 | Lo .......................... | B60L 11/12 |
| | | | 180/165 |
| 2015/0057901 A1* | 2/2015 | Sundholm ............. | B60K 17/28 |
| | | | 701/67 |

FOREIGN PATENT DOCUMENTS

DE    10 2008 040 757 A1    2/2010

* cited by examiner

*Primary Examiner* — Justin Holmes
(74) *Attorney, Agent, or Firm* — Davis & Bujold PLLC; Michael J. Bujold

(57) ABSTRACT

A method, a control unit and a computer program product for coupling an auxiliary power take-off of a motor vehicle transmission, in which, after a command to couple the auxiliary power take-off, conditions required for the coupling of the auxiliary power take-off are checked and, if the conditions are satisfied, an actuator system for coupling the auxiliary power take-off is activated. If, after the command to couple the auxiliary power take-off, the conditions for coupling the auxiliary power take-off are not fulfilled, then a control unit acts upon drive-train components in order to produce the conditions required for the coupling of the auxiliary power take-off.

12 Claims, 2 Drawing Sheets

METHOD FOR COUPLING A POWER TAKE-OFF

This application claims priority from German patent application Ser. No. 10 2015 223 595.5 filed Nov. 27, 2015.

FIELD OF THE INVENTION

The invention concerns a method for coupling an auxiliary power take-off of a motor vehicle transmission. In addition, the invention concerns a control unit designed to implement the method, and a corresponding computer program product.

BACKGROUND OF THE INVENTION

Transmissions of commercial vehicles in particular often have auxiliary power take-offs by way of which additional aggregates of the commercial vehicle concerned can be connected to an auxiliary output of the transmission concerned and thereby be operated. For the operation of such additional aggregates a corresponding drive torque is picked up from the auxiliary power take-off concerned. To be able to couple and decouple the auxiliary power take-off according to need, a shifting element is usually associated with the auxiliary power take-off, such shifting elements being in most cases in the form of interlocking shifting elements such as claw clutches.

Besides fixed auxiliary power take-offs by means of which a particular additional aggregate can only be operated when the vehicle is at rest, the vehicle transmissions in commercial vehicles are often equipped with mobile auxiliary power take-offs by way of which a corresponding additional aggregate can be operated even while the motor vehicle is in motion. However, since additional aggregates usually only have a limited permissible operating range, a mobile auxiliary power take-off can only be activated in certain gears of the transmission.

DE 10 2008 040 757 A1 describes a method for coupling an auxiliary power take-off of a transmission, wherein during the course of the coupling, an interlocking shifting element of the auxiliary power take-off is actuated so as to close when all the conditions required for the coupling of the auxiliary power take-off are fulfilled. If the conditions are not fulfilled, the process starts afresh or reverts to one of the previous process steps. The driver of the vehicle must then himself establish the conditions required for the auxiliary power take-off to be coupled, but on the one hand this can be perceived as complicated and on the other hand as annoying if the vehicle driver has to repeat individual steps in the event that at the time when the coupling of the auxiliary power take-off is commanded, the necessary conditions are not fulfilled.

SUMMARY OF THE INVENTION

Starting from the above-described prior art the purpose of the present invention is now to provide a process for coupling an auxiliary power take-off of a motor vehicle transmission by virtue of which the coupling of an auxiliary power take-off is simplified and made quicker. In addition, a corresponding control unit designed to implement the process and a computer program product for implementing the process are indicated.

From the process-technological standpoint these objectives are achieved starting from the invention described below having the characterizing features recited in the claims. In addition, a control unit for coupling an auxiliary power take-off of a motor vehicle transmission is the object of the invention which includes a computer program product as described below. Advantageous further developments are the object of the subordinate claims and of the description given below.

A method is proposed for coupling an auxiliary power take-off of a motor vehicle transmission while the vehicle is at rest, in which, when the coupling of the auxiliary power take-off is commanded, the conditions required for the coupling of the auxiliary power take-off are checked. If these conditions are satisfied, then an actuator system for coupling the auxiliary power take-off is activated. By means of the actuator system for coupling the auxiliary power take-off, a preferably interlocking shifting element is actuated, the shifting element being for example in the form of a claw clutch or a lock synchronization which, in the actuated state, connects the auxiliary power take-off to the motor vehicle transmission, in particular to a transmission shaft of the motor vehicle transmission. The motor vehicle transmission is part of a drive-train of the motor vehicle, and by way of the auxiliary power take-off, an additional aggregate such as a waste compactor, a motor mower, a compressor, a turntable ladder or similar can be operated while the motor vehicle is in motion or at rest. The auxiliary power take-off can be designed as a mobile or a fixed auxiliary power take-off.

The motor vehicle transmission is preferably an automatic or automated transmission which, for example, can be in the form of an automated multi-step shifting transmission, an automatic transmission, a dual clutch transmission, a continuously power-branched transmission, etc. The motor vehicle transmission can also consist of a number of transmission groups, in which a splitter group is connected upstream or downstream from a main group and/or a range group is connected downstream from the main group. The motor vehicle in which a motor vehicle transmission according to the invention is used, is preferably a commercial vehicle such as a truck or else a municipal or agricultural utility vehicle such as a tractor.

The invention, now, is based on the technical principle that when, after the coupling of the auxiliary power take-off has been commanded, the necessary conditions for the auxiliary power take-off to be coupled are not satisfied, then by means of a control unit, drive-train components are acted upon in such manner that the conditions required for coupling the auxiliary power take-off are fulfilled.

Since the control unit itself is responsible for producing the conditions needed for coupling the auxiliary power take-off, the vehicle driver can be relieved of that responsibility and an auxiliary power take-off can be coupled simply and quickly. In contrast, in the case of DE 10 2008 040 757 A1 an auxiliary power take-off can only be coupled if the vehicle driver himself establishes the conditions required for the coupling of the auxiliary power take-off.

As one condition for the coupling of the auxiliary power take-off, it is checked whether the vehicle is at rest. If this check shows that the vehicle is in motion, then the control unit actuates a braking device of the vehicle or of the motor vehicle transmission in order to bring the vehicle to rest. For example, the control unit can actuate a service brake of the motor vehicle or, if a gear is engaged in the motor vehicle transmission, it can actuate a transmission brake of the motor vehicle transmission until the vehicle has stopped.

That the vehicle has stopped and is at rest can for example be determined by means of wheel rotational speed sensors or by a rotational speed sensor arranged on the output shaft of the motor vehicle transmission. In this context a vehicle is understood to have stopped or to be at rest not only when it is actually at rest, but also in a condition in which the motor vehicle is moving at a speed that does not exceed a specifiable speed limit for the coupling of a fixed auxiliary power take-off. Thus, in such a condition the vehicle is nearly at rest.

According to an advantageous embodiment it is provided that automatic brake engagement by the control unit is only carried out when a current vehicle speed is lower than a specifiable speed limit. Thus, automatic brake engagement is only authorized within a predeterminable speed range, preferably only at low vehicle speeds. On the other hand, if coupling of the auxiliary power take-off is commanded when the vehicle speed is higher than the specifiable speed limit, then the control unit does not actuate the braking device and the vehicle is not brought to rest by the control unit. In that way overloading of the braking device can be avoided.

As a further condition for coupling the auxiliary power take-off, it is checked whether the motor vehicle transmission is in a neutral position. If the motor vehicle transmission is not in neutral, i.e. if a gear is currently engaged in the motor vehicle transmission, then the control unit activates an actuator system of the motor vehicle transmission so as to disengage the currently engaged gear. Whether the motor vehicle is in neutral or whether the current gear has been successfully disengaged, can for example be determined by means of a position or path sensor associated with a shift actuation system.

In addition, as a condition for coupling the auxiliary power take-off, it is checked whether a clutch arranged between a drive engine and the motor vehicle transmission is open. If the clutch is not in an open condition but in a closed condition, then the control unit operates an actuator system to actuate the clutch so that it changes to the open condition. The status of the clutch too can, for example, be determined by a position or path sensor.

Thus, according to the present invention, when after a command by the driver of the vehicle to couple the auxiliary power take-off the conditions required for coupling the auxiliary power take-off are not satisfied, the control unit acts upon drive-train components in such manner that the conditions needed for coupling the auxiliary power take-off are fulfilled. In this way an auxiliary power take-off can be coupled quickly and reliably after a command by the driver of the vehicle, even when the conditions required for coupling the auxiliary power take-off are not initially satisfied.

If the conditions for coupling the auxiliary power take-off are fulfilled, then the control unit acts upon an actuator system in order to couple the auxiliary power take-off. In this case it is advantageous to monitor the coupling of the auxiliary power take-off and in the event that, despite the activation of the actuator system, the auxiliary power take-off has not been properly coupled, the coupling is assisted by methods long known from the prior art by those familiar with the field. For example, the auxiliary power take-off can be recognized as coupled when a position or path sensor detects that the actuator for coupling the auxiliary power take-off has moved through a predetermined distance or reached a particular position.

If the auxiliary power take-off is recognized as correctly coupled or engaged, the control unit checks whether the coupled auxiliary power take-off is a fixed or mobile auxiliary power take-off.

If the control unit recognizes that the coupled auxiliary power take-off is a fixed auxiliary power take-off, then the control unit activates a braking device of the motor vehicle, such as a parking brake, when this is provided for the operation of the auxiliary power take-off. Furthermore engagement of a starting gear is blocked so that the motor vehicle transmission is kept in the neutral position. Finally, when the parking brake has been activated and the vehicle transmission is in neutral, the clutch between the drive engine and the motor vehicle transmission is closed and the engine torque from the drive engine is adjusted to a level required for the operation of the auxiliary power take-off.

In contrast, if the control unit has recognized that the coupled auxiliary power take-off is a mobile auxiliary power take-off, then the control unit engages a starting gear in the motor vehicle transmission that is permissible for the operation of the auxiliary power take-off. In choosing the permissible starting gear it is preferably checked that the gear is compatible with the last driving direction set by the driver of the vehicle. For example, if during the auxiliary power take-off coupling process the vehicle driver commands a new driving direction by means of a drive switch, then a gear is engaged which is compatible with this new driving direction and is appropriate for the operation of the auxiliary power take-off. The gear appropriate for the driver's command and permissible for operating the auxiliary power take-off can therefore be either a forward driving gear or a reversing gear of the motor vehicle transmission. Even with a coupled mobile auxiliary power take-off the vehicle driver can call for a neutral position of the motor vehicle transmission, and then the motor vehicle transmission is kept in the neutral position as in the case of a fixed auxiliary power take-off. Finally, when a starting gear has been engaged or the motor vehicle transmission is in neutral, the clutch arranged between the drive engine and the motor vehicle transmission is closed and the engine torque or engine rotational speed of the drive engine is adjusted to a level required for the operation of the auxiliary power take-off.

Basically, it would also be possible to couple a mobile auxiliary power take-off while the motor vehicle is moving. However, that would require a temporary neutral phase in the motor vehicle transmission during the coupling of the auxiliary power take-off, in which phase a traction or braking force of the drive engine is not available. Accordingly, according to the present invention both fixed and mobile auxiliary power take-offs are coupled while the vehicle is at least approximately at rest.

The invention also concerns a control unit designed to implement the method according to the invention. The control unit comprises means that serve to carry out the method according to the invention. These means include both hardware and software means. The hardware means consist of data interfaces for the exchange of data with the drive-train assemblies involved in the implementation of the method according to the invention. For example the control unit receives signals from rotational speed sensors that detect a transmission output rotational speed or a wheel rotational speed, and signals from a position sensor system by means of which a distance covered by, or a position of a shifting element of the motor vehicle transmission or of the clutch is detected. The hardware means of the control unit also include a processor for data processing and, if necessary, memory for data storage. The software means consist of program modules for carrying out the method according to the invention.

Thus, for carrying out the method according to the invention the control unit has at least one receiving interface designed to receive at least a signal that indicates a command to couple an auxiliary power take-off, a signal which indicates that the vehicle is at rest, a signal indicating that the motor vehicle transmission is in neutral, a signal indicating the status of the clutch arranged between the drive engine and the motor vehicle transmission, and a signal indicating the position of a shifting element of the auxiliary power take-off. The control unit also comprises an evaluation unit in order to evaluate the input signals received or the information from the input signals received. With reference to the input signals received and the information from them, the control unit determines whether the conditions required for the coupling of the auxiliary power take-off are in place. If the conditions for coupling the auxiliary power take-off are satisfied, then by way of a sending interface the control unit emits a corresponding control signal for the coupling of the auxiliary power take-off. On the other hand, if the conditions are not fulfilled, then via the sending interface the control unit emits corresponding control signals for the activation of appropriate drive-train components in order to produce the conditions required for coupling the auxiliary power take-off. The control unit can for example be in the form of a central control device or a transmission control device.

The above-mentioned signals should be regarded only as examples and are not intended to limit the invention. The input signals received and the control signals emitted can be transmitted via a vehicle bus, for example a CAN bus.

The system according to the invention can also be embodied in a computer program product which, when it is run on a processor of a control unit, instructs the processor software to carry out the associated process steps that constitute the objects of the invention. In that connection a computer-readable medium is also part of the object of the invention, in which a computer program products described is stored and from which it can be recalled.

The invention is not limited to the indicated combination of features in the associated claims or the claims that depend on them. There are also possible ways to combine individual features with one another, always provided that they emerge from the claims, the description of embodiments given below, or directly from the drawings. The reference in the claims to the drawings by using indexes does not restrict the protective scope of the claims.

BRIEF DESCRIPTION OF THE DRAWINGS

Advantageous designs of the invention, which are explained below, are illustrated in the drawings, which show.

DETAILED DESCRIPTION OF THE PREFERRED EMBODIMENTS

Figure 1:
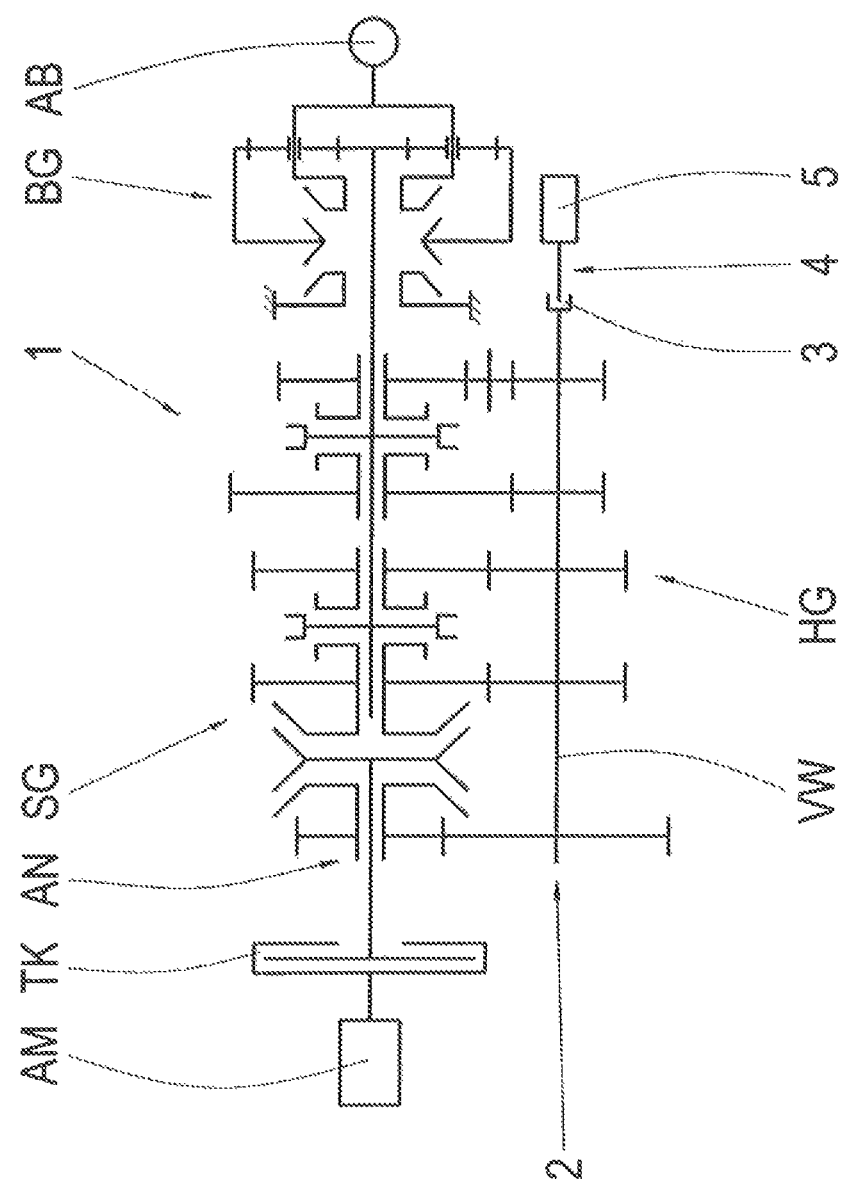
FIG. 1: A schematic view of part of a drive-train according to the invention, with a motor vehicle transmission of group design.

FIG. 1 shows a schematic view of part of a drive-train of a commercial vehicle that corresponds to an embodiment of the invention. In this drive-train a drive engine AM, for example in the form of an internal combustion engine, can be connected on its output side, by way of a separator clutch TK, to an input side AN of a motor vehicle transmission 1. According to FIG. 1 the motor vehicle transmission 1 is in the form of an automated change-speed transmission of group configuration and consists of an unsynchronized main group HG, a synchronized splitter group SG upstream from the main group HG and a synchronized range group downstream from the main group HG. In this case the range group BG is of planetary design whereas the splitter group SG and the main group HG are formed of individual spur gear stages, which in the case of the main group HG can each be connected into a force flow by means of unsynchronized claw clutches and in the case of the splitter group SG can be so connected by way of lock synchronizers, and in that way define the various gears of the motor vehicle transmission 1. Consequently, when the separator clutch TK is closed a drive input movement of the drive engine AM can correspondingly be transmitted by way of the splitter group SG, the main group HG and the range group BG to an output side AB of the motor vehicle transmission 1 with a corresponding gear ratio, the output side being connected to downstream components of the drive-train of the commercial vehicle long known to those familiar with the field.

As can also be seen from FIG. 1, the splitter group SG and the main group HG have a common intermediate gear system 2, wherein at one end of a countershaft VW of the intermediate gear system 2 an interlocking shifting element 3 for connecting a clutch-controlled auxiliary power take-off 4 is provided, by means of which an additional aggregate 5 can be driven. In this case, the shifting element 3 is in the form of a claw clutch which, in its closed condition, couples a drive input of the additional aggregate 5 to the countershaft VW in a rotationally fixed manner. The opening and also the closing of the interlocking shifting element 3 are controlled by a control unit of the motor vehicle transmission 1 (not shown in more detail here). The control unit can for example be in the form of a transmission control device which, among other things, also controls gearshifts of the automated change-speed transmission and during these, as well as during starting processes of the commercial vehicle, can act to issue commands to an engine control device of the drive engine AM (also not shown in more detail) and to the separator clutch TK. When the control unit is in the form of a transmission control device, it is also designed to control a braking device of the motor vehicle or of the motor vehicle transmission, or to cause a brake control device to trigger a corresponding brake actuation.

Figure 2:
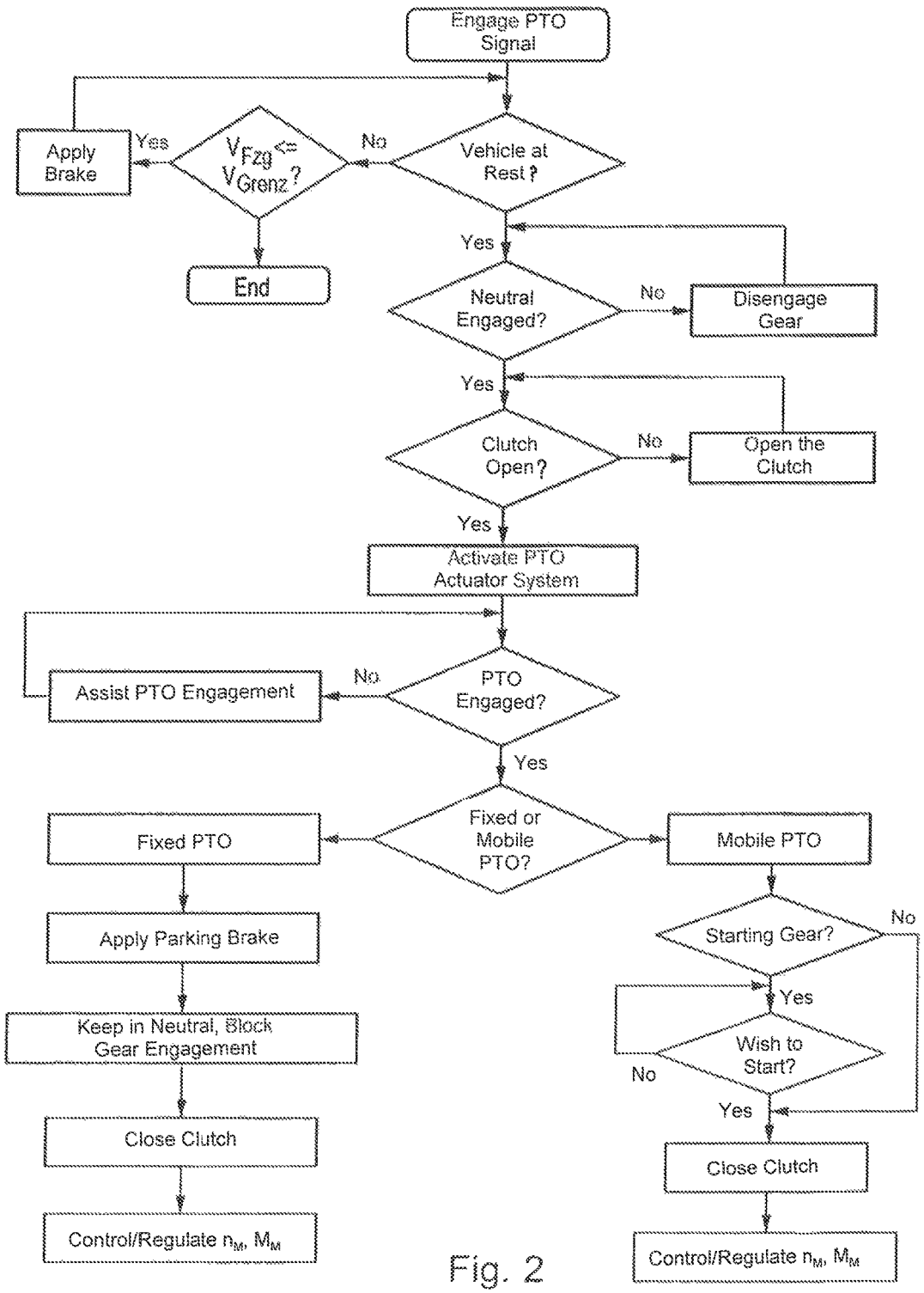
FIG. 2: A flow chart of a method according to the invention for coupling an auxiliary power take-off of the motor vehicle transmission shown in FIG. 1.

In the present case the auxiliary power take-off 4 can be in the form of a fixed or a mobile auxiliary power take-off 4. When designed as a mobile auxiliary power take-off 4 the additional aggregate 5 powered by the auxiliary power take-off 4 can also be operated while the commercial vehicle is in motion. In the present case it is provided that besides the coupling of a fixed auxiliary power take-off 4, a mobile auxiliary power take-off 4 can also be coupled when the motor vehicle is at least nearly at rest. In such a case the process represented in FIG. 2 in the form of a flow chart is carried out, which process will now be described with the help of FIG. 2:

At the beginning of the process the auxiliary power take-off 4 is decoupled, so that while the commercial vehicle is moving the additional aggregate 5 is not being driven.

In a first step the control unit receives a signal commanding the coupling of the auxiliary power take-off 4. That signal can be produced by the driver of the vehicle, for example by actuating a switch or key for coupling the auxiliary power take-off 4. If such a command to couple the auxiliary power take-off 4 has been made, then in the context of the method it is checked whether the conditions required for the auxiliary power take-off 4 to be coupled are in place. Thus, as a condition it is first checked whether the commercial vehicle is at rest. If the commercial vehicle is not at rest, then the control unit authorizes a braking action to bring the vehicle to rest provided that a current vehicle speed does not exceed a specified or specifiable speed limit. For this the control unit can for example emit a signal to a brake control device, which then actuates the service brakes of the commercial vehicle until the vehicle comes to rest. In contrast, if the current vehicle speed is above the specified speed limit, the process of coupling the auxiliary power take-off is terminated. Thus, the automatic braking triggered by the control unit is only permitted within a predeterminable speed range, preferably only at low vehicle speeds.

When the vehicle is at rest, as a further condition it is checked whether the motor vehicle transmission 1 is in a neutral position. If the motor vehicle transmission is not in neutral, i.e. if a gear is engaged in the motor vehicle transmission at the time, then the control unit authorizes that disengagement of the engaged gear, which is then disengaged by activating an actuator system in the transmission.

If the motor vehicle transmission 1 is in the neutral position, then as a further condition it is checked whether the separator clutch TK arranged between the drive engine AM and the motor vehicle transmission 1 is open. If the separator clutch TK is closed, the control unit authorizes the opening of the separator clutch TK. Finally, a clutch actuation system so authorized opens the clutch TK.

Thus, according to the present invention, when after a command from the vehicle driver to couple the auxiliary power take-off 4 it is found that the conditions required for coupling the auxiliary power take-off 4 are not satisfied, then a control unit emits appropriate signals so that the conditions needed for the auxiliary power take-off 4 to be coupled are fulfilled automatically.

Only when the conditions required for the auxiliary power take-off 4 to be coupled are fulfilled, in a further process step the shifting element 3 for coupling the auxiliary power take-off 4 is actuated and thereafter the coupling of the auxiliary power take-off 4 is checked. If despite the actuation of the auxiliary power take-off 4 cannot be engaged, for example owing to a tooth-on-tooth position of the claw clutch, then the coupling of the auxiliary power take-off 4 is assisted by methods long known to those familiar with the field.

When the auxiliary power take-off 4 has been coupled, in a further process step the control unit checks whether the coupled auxiliary power take-off 4 is a fixed or a mobile auxiliary power take-off 4.

If it is found that the coupled auxiliary power take-off 4 is a fixed auxiliary power take-off 4, then the control unit actuates a braking device of the motor vehicle, preferably a parking brake. In addition the engagement of any gear is blocked by the control unit so that the motor vehicle transmission 1 is kept in its neutral position. Since the motor vehicle transmission 1 is in neutral and a gear engagement is blocked by the control unit, the separator clutch TK is now closed and the auxiliary power take-off 4 can be operated by means of the drive engine AM. For this it can be provided that the engine rotational speed or engine torque is controlled or regulated by the control unit. For example, the control unit can increase the engine rotational speed or engine torque to a value required for operating the additional aggregate 5, or it can limit them to a maximum value.

In contrast, if it is established that the coupled auxiliary power take-off 4 is a mobile auxiliary power take-off 4, then in response to a command from the driver a starting gear is engaged or the motor vehicle transmission 1 is kept in the neutral position. When the starting gear is engaged, in a further process step it is checked whether a driver's wish to start off has been detected. As a desire to start, for example an actuation of an accelerator pedal by the vehicle driver can be detected. When with a starting gear engaged a wish to start has been recognized or when, by virtue of the driver's command, the motor vehicle transmission 1 is in neutral, the control unit authorizes the closing of the separator clutch TK arranged between the drive engine AM and the motor vehicle transmission 1, and the engine rotational speed or engine torque is controlled or regulated to a level required for the operation of the drive-train or for the operation of the auxiliary power take-off.

INDEXES

1 Motor vehicle transmission
2 Intermediate gear system
3 Shifting element
4 Auxiliary power take-off
5 Additional aggregate
AM Drive engine
TK Separator clutch
HG Main group
SG Splitter group
BG Range group
AN Drive input side
AB Drive output side
VW Countershaft

The invention claimed is:

1. A method of coupling an auxiliary power take-off of a motor vehicle transmission while the vehicle is at rest, the method comprising:
after a command to couple the auxiliary power take-off, checking conditions for the coupling of the auxiliary power take-off;
when the conditions for the coupling of the auxiliary power take-off are satisfied, activating an actuator system for coupling the auxiliary power take-off;
when, after the command to couple the auxiliary power take-off, the conditions for the coupling of the auxiliary power take-off are not fulfilled, acting upon drive-train components with a control unit to produce the conditions for the coupling of the auxiliary power take-off.

2. The method according to claim 1, further comprising checking, as one condition for the coupling of the auxiliary power take-off, when the vehicle is at rest, and when the vehicle is in motion, bringing the vehicle to rest by actuating, with the control unit, a braking device of the vehicle or of the motor vehicle transmission.

3. The method according to claim 2, further comprising only carrying out an automatic brake application when a current vehicle speed is not in excess of a specifiable speed limit.

4. The method according to claim 1, further comprising checking, as one condition for the coupling of the auxiliary power take-off, when the motor vehicle transmission is in a neutral position, and, when a gear is currently engaged in the motor vehicle transmission, activating an actuator system of the motor vehicle transmission with the control unit to disengage the currently engaged gear.

5. The method according to claim 1, further comprising checking, as one condition for coupling the auxiliary power take-off, when a clutch, arranged between a drive engine and the motor vehicle transmission, is disengaged, and, when the clutch is engaged, activating an actuator system with the control unit to actuate the clutch so as to change the clutch to a disengaged condition.

6. The method according to claim 1, further comprising activating an actuator system with the control unit, once the conditions for coupling the auxiliary power take-off are satisfied, to couple the auxiliary power take-off and checking when the auxiliary power take-off is coupled.

7. The method according to claim 6, further comprising, following coupling of the auxiliary power take-off, determining with the control unit when the coupled auxiliary power take-off is a fixed auxiliary power take-off or a mobile auxiliary power take-off.

8. The method according to claim 7, further comprising following the determinating that the coupled auxiliary power take-off is a fixed auxiliary power take-off, initiating with the control device at least one of:
   activating a parking brake of the motor vehicle;
   blocking of a gear engagement in the motor vehicle transmission;
   engaging a clutch arranged between a drive engine and the motor vehicle transmission; and
   at least one of controlling and regulating one of an engine torque and an engine rotational speed of the drive engine.

9. The method according to claim 7, further comprising following the determinating that the coupled auxiliary power take-off is a mobile auxiliary power take-off, initiating with the control device at least one of:
   engaging a gear appropriate in relation to a wish of a driver;
   engaging a clutch arranged between a drive engine and the motor vehicle transmission when either a starting gear appropriate in relation to the wish of the driver is engaged in the motor vehicle transmission and a vehicle driver's wish to start off is recognized, or when, by virtue of a driver's command, the motor vehicle transmission is shifted to a neutral position; and
   at least one of controlling and regulating one of an engine torque and an engine rotational speed of the drive engine.

10. A control unit for coupling an auxiliary power take-off of a motor vehicle transmission, the control unit comprising at least one receiving interface designed to receive input signals from drive-train components, an evaluation unit for evaluating the input signals received and information in the input signals received, and a sending interface for emitting control signals to the drive-train components, the control unit being designed such that after a command to couple the auxiliary power take-off, on a basis of the input signals received, the control unit checks conditions required for the coupling of the auxiliary power take-off and when the control unit determines that the conditions are satisfied, the control unit activates an actuator system for coupling the auxiliary power take-off whereas when the control unit determines that the conditions required for the coupling of the auxiliary power take-off are not satisfied, the control unit acts upon drive-train components in order to produce the conditions required for the coupling of the auxiliary power take-off so that thereafter the control unit can activate the actuator system for coupling the auxiliary power take-off.

11. The control unit according to claim 10, wherein the control unit carries out a method for coupling the auxiliary power take-off of the motor vehicle transmission while the vehicle is at rest, the method including:
   after a command to couple the auxiliary power take-off, checking the conditions required for the coupling of the auxiliary power take-off;
   when the conditions required for the coupling of the auxiliary power take-off are satisfied, activating the actuator system for coupling the auxiliary power take-off; and
   when, after the command to couple the auxiliary power take-off, the conditions required for the coupling of the auxiliary power take-off are not fulfilled, acting upon the drive-train components with the control unit to produce the conditions required for the coupling of the auxiliary power take-off.

12. A computer program product with program code means, which are stored in a computer-readable data support, the computer program product is run on a control unit to carry out a method for coupling an auxiliary power take-off of a motor vehicle transmission while the vehicle is at rest, the method including:
   after a command to couple the auxiliary power take-off, checking conditions for the coupling of the auxiliary power take-off;
   when the conditions for the coupling of the auxiliary power take-off are satisfied, activating an actuator system for coupling the auxiliary power take-off; and
   when, after the command to couple the auxiliary power take-off, the conditions for the coupling of the auxiliary power take-off are not fulfilled, acting upon drive-train components with a control unit to produce the conditions for the coupling of the auxiliary power take-off,
   wherein the control unit has at least one receiving interface designed to receive input signals from the drive-train components, an evaluation unit for evaluating the input signals received and information in the input signals received, and a sending interface for emitting control signals to the drive-train components.

* * * * *